United States Patent [19]

Meguro et al.

[11] Patent Number: 5,023,648
[45] Date of Patent: Jun. 11, 1991

[54] FLASH TAKING LENS SHUTTER CAMERA

[75] Inventors: Hiroshi Meguro, Kawasaki; Tsugio Takahashi; Hitoshi Aoki, both of Tokyo; Toru Kosaka, Zama, all of Japan

[73] Assignee: Nikon Corporation, Tokyo, Japan

[21] Appl. No.: 331,304

[22] Filed: Mar. 31, 1989

[30] Foreign Application Priority Data

Apr. 5, 1988 [JP] Japan .................................. 63-84359

[51] Int. Cl.[5] .......................... G03B 7/00; G03B 15/03
[52] U.S. Cl. .................................... 354/420; 354/456; 354/267.1
[58] Field of Search ............... 354/420, 435, 439, 456, 354/195.1, 266, 267.1

[56] References Cited

U.S. PATENT DOCUMENTS 4,426,145  1/1984  Hashimoto ....................... 354/195.1
4,479,704  10/1984 Masunaga ........................... 354/137
4,827,304  5/1989  Watanabe et al. ................... 354/435

Primary Examiner—L. T. Hix
Assistant Examiner—Cassandra C. Spyrou
Attorney, Agent, or Firm—Shapiro and Shapiro

[57] ABSTRACT

A lens shutter camera comprises a mode signal output device for outputting either a first flash mode signal or a second flash mode signal, a shutter driving device for effecting the opening movement of the lens shutter slowly and effecting the closing movement of the lens shutter quickly when the first flash mode signal is being outputted, and for effecting both of the opening and closing movements of the lens shutter slowly when the second flash mode signal is being outputted, and a flash start signal output device for outputting a flash start signal during the opening movement of the lens shutter when the first flash mode signal is being outputted, and for outputting the flash start signal during the closing movement of the lens shutter when the second flash mode signal is being outputted.

4 Claims, 3 Drawing Sheets

FLASH TAKING LENS SHUTTER CAMERA

BACKGROUND OF THE INVENTION

1. Field of the Invention

The present invention relates to a flash taking camera having a program lens shutter wherein the opening movement of the shutter is effected slowly and the closing movement of the shutter is effected quickly.

2. Related Background Art

A conventional program lens shutter such as disclosed in the U.S. Pat. No. 4,426,145 generally has a shutter opening feature that the opening movement of shutter blades serving also as an aperture is effected slowly (about 15-30 ms) and the closing movement of the shutter blades is effected quickly (about 5 ms), as shown in a graph of FIG. 6(a) where the ordinate indicates "area of aperture" AS and the abscissa indicates "time" t.

In the lens shutter camera having such shutter opening feature, when taking a photograph by energizing an electronic flash device, a flashmatic control is effected. In this case, as shown in FIG. 6(b), while the shutter blades are opened, i.e., before the shutter is completely opened, a flash start signal S is sent to the electronic flash device by closing a synchronizing contact, thus energizing the electronic flash device. With respect to an object having low brightness or luminance, since there is the possibility of camera shake due to a slow shutter speed, the shutter speed is limited to a certain time limit so as not to be too long. Here, the flashmatic control means that the timing of the flash emission is so controlled that the flash emission is started when the lens shutter reaches a predetermined shutter opening determined by the object distance and a guide number.

However, when shutter speed is limited as stated above, if an object field includes a low luminance object such as a night view, lamp, candle or the like, as well as a main object such as a person, such low luminance object is not so clearly taken, but only the main object which receives the flash light is clearly taken, thus providing an unnatural picture in which the main object floats on a black background.

In order to eliminate such drawback, recently, a lens shutter camera having a so-called slow synchronizing mode wherein the flash is emitted synchronously with a relatively slow shutter time has been proposed. However, in such lens shutter camera, since the timing of the flash emission of the electronic flash device is set at a point in the period when the shutter blades are being opened, when a moving light spot such as head lamps of a moving vehicle is taken, since the electronic flash device is emitted or energized at the beginning of the exposure period to expose the body (vehicle) for generating the light spot (head lamps) and there is a relatively long time from the energization of the electronic flash device to the full open state of the shutter, an unnatural picture in which there are traces of the head lamps ahead of the vehicle will be obtained.

In order to eliminate such drawback, it can be considered that the electronic flash device be energized during the closing movement of the shutter blades by utilizing a second blind (trailing blades) synchronism in a single lens reflex camera. However, in the shutter opening feature of the conventional lens shutter camera, as apparent from FIG. 6(a), since the closing movement of the shutter is very fast (as 5 ms), it is very difficult to control the timing of the flash emission, and, thus, such technique has not yet been realized.

SUMMARY OF THE INVENTION

An object of the present invention is to provide a flash taking lens shutter camera which permits the flash emission and the timing control thereof in the closing movement of the shutter blades and which, particularly in the slow synchronizing mode, even when a main object having a luminous source as a part thereof is moving, the main object having the luminous source can be taken subsequently to the moving luminous source (i.e., which does not generate the trace of the source in the picture).

The present invention is applicable to a lens shutter camera which is provided with a lens shutter and which can take a photograph with flash light by outputting a flash start signal to a flash device at a predetermined timing. And, according to the present invention, the aforementioned drawbacks can be completely eliminated by providing a lens shutter camera comprising mode signal output means for outputting either a first flash mode signal or a second flash mode signal, shutter driving means for effecting the opening movement of the lens shutter slowly and effecting the closing movement of the lens shutter quickly when the first flash mode signal is being outputted, and for effecting both of the opening and closing movements of the lens shutter slowly when the second flash mode signal is being outputted, and flash start signal output means for outputting a flash start signal during the opening movement of the lens shutter when the first flash mode signal is being outputted, and for outputting the flash start signal during the closing movement of the lens shutter when the second flash mode signal is being outputted.

In the present invention, for example, when the second flash mode signal is being outputted to command the slow synchronizing mode, the opening and closing movements of the shutter are executed slowly, and the flash start signal is outputted during the closing movement of the shutter to energize the flash device. Since the flash start signal is outputted during the slow movement of the shutter, the timing of the flash emission can be easily controlled, and, thus, it is possible to easily emit the flash at a timing near the end of the exposure process, as in the case of the second blind synchronism in the single lens reflex camera. Accordingly, it is possible to obtain a natural picture even with respect to an object having a moving luminous source. When the first flash mode signal is being outputted to command a normal flash mode, the flash emission is started during the opening movement of the shutter.

DETAILED DESCRIPTION OF THE PREFERRED EMBODIMENTS

The present invention will now be explained in connection with a preferred embodiment thereof with reference to FIGS. 1 to 5.

First of all, a construction of a lens shutter will be explained.

Figure 1:
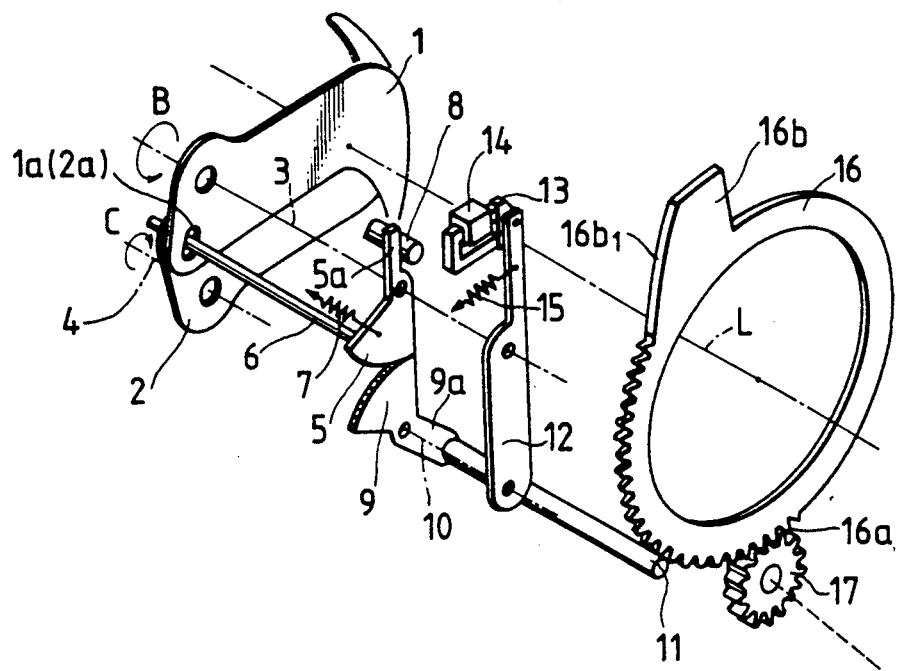
FIG. 1 is a whole constructional view of a lens shutter control apparatus incorporating a flash device therein, applying the present invention thereto.
Figure 1:
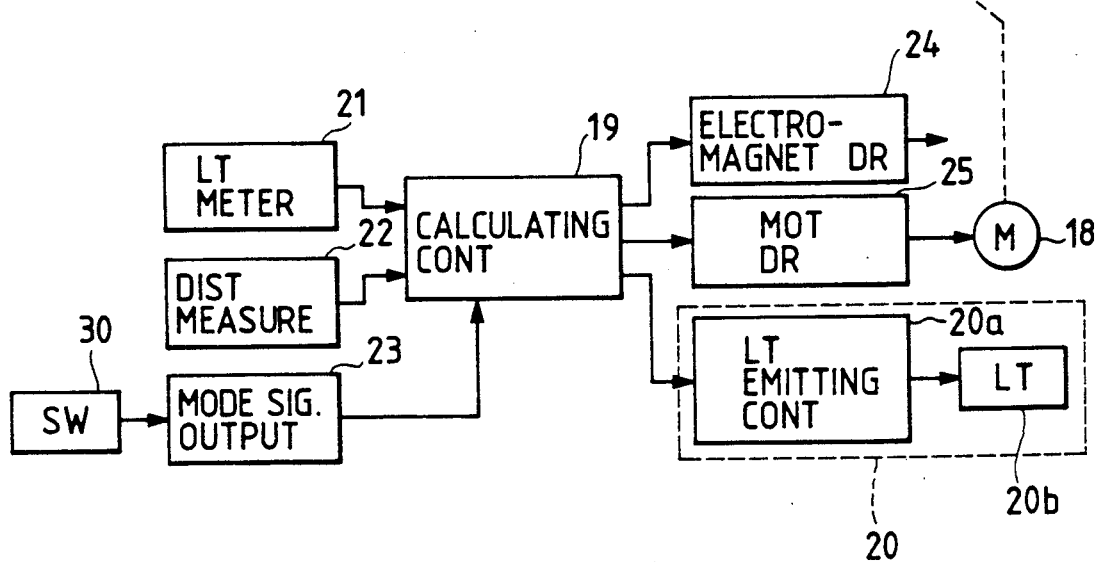

In FIG. 1, a pair of shutter blades 1 and 2 carrying out an exposure operation are arranged in such a manner that when the shutter is fully opened the shutter blades are partially overlapped. The shutter blades are rotatably supported at one end by corresponding shafts 3 and 4 which are arranged in parallel with each other.

A fan-shaped first gear member 5 is rotatably mounted on the shaft 3, which gear member can effect opening and closing movements of the shutter blades 1 and 2 to form an exposure opening around an optical axis L. A free end of a pin 6 protruded perpendicularly from a side surface of the first gear member 5 is received in elongated slots 1a and 2a (only the slot 1a is seen in FIG. 1) formed in the shutter blades 1, 2 in the vicinity of their pivot points. A bias spring 7 for biasing the shutter blades 1, 2 toward their closed positions is connected to the first gear member 5. Further, a projection lug 5a protruded from the vicinity of the pivot point of the first gear member 5 in a direction opposite to a toothed portion of the gear member abuts against a fixed stop 8 to regulate a clockwise rotation of the first gear member 5, thereby holding the shutter blades 1, 2 in their full opened position.

A fan-shaped second gear member 9 meshed with the first gear member 5 is pivotally mounted on a shaft 10. An operation pin 11 extending parallel to the shaft 10 is fixedly connected, at one end, to a projection 9a protruded laterally from the second gear member 9 in the vicinity of the pivot point thereof.

The pivot shaft 10 of the second gear member 9 for effecting the opening and closing movements of the shutter blades 1, 2 is supported by an end of an armature lever 12. The armature lever 12 is pivotally mounted, at its intermediate portion, on the shaft 3 and is provided at its other end with an armature 13 fixed thereto, which armature 13 is arranged in confronting relation to an electromagnet device 14 which can attract the armature. Further, a reset spring 15 connected to the other end portion of the armature lever 12 biases the armature lever in an anticlockwise direction (FIG. 1) to abut the armature 13 against the electromagnet device 14.

A drive ring 16 is provided for driving the shutter blades 1, 2 toward the open position or the closed position and is rotatably supported to rotate around the optical axis L. The drive ring 16 is provided at its periphery with a gear portion 16a and a cam 16b which is adjacent to one end of the gear portion 16a and can be engaged by the operation pin 11 of the second gear member 9. The gear portion 16a of the drive ring 16 is meshed with a gear 17 rotated by a motor 18 described later.

Incidentally, the drive mechanism for the shutter blades as mentioned above constitutes shutter drive means.

Next, a construction of a control system will be explained.

In FIG. 1, a calculating control circuit 19 constituted by a microcomputer is provided for controlling the electromagnet device 14, the motor 18 and an electronic flash device 20. A photometric circuit (LT meter) 21 and a distance measuring circuit 22 which are operated in response to the initiation of a half-push operation of a release button (not shown) are connected to the calculating circuit 19. Luminance information corresponding to the brightness or luminance of an object is inputted from the photometric circuit 21 to the calculating circuit 19, and distance information corresponding to an object distance is inputted from the distance measuring circuit 22 to the calculating circuit 19. Further, the input of the calculating circuit 19 is also connected to a mode signal output circuit 23 for switching over modes between a normal flash mode and a slow synchronizing mode in the lens shutter camera incorporating the flash device. Here, the normal flash mode means that the flash is energized synchronously with a relatively short shutter time in that mode, and the slow synchronizing mode means that the flash is energized synchronously with a further longer shutter time in that mode. By manipulating a mode selection switch 30 provided on the camera, either mode is selected, with the result that a normal flash mode signal (first flash mode signal) or a slow synchronizing mode signal (second flash mode signal) is outputted from the mode signal output circuit 23.

Further, an output of the calculating control circuit 19 is connected to an electromagnet drive circuit 24 for controlling ON-OFF of the electromagnet device 14, a motor drive circuit 25 for controlling the motor 18, and the electronic flash device 20. The electronic flash device 20 is constituted by a light emitting control circuit 20a and a light or flash lamp 20b energized by an output of the light emitting control circuit 20a. When the flash start signal from the calculating control circuit 19 is inputted to the light emitting circuit 20a, the latter is operated to light the flash lamp 20b. In the normal flash mode, the flash start signal is outputted at a predetermined timing during the opening movement of the shutter, whereas, in the slow synchronizing mode, the flash start signal is outputted at a predetermined timing during the closing movement of the shutter. The timing of the flash emission is set on the basis of the distance measurement information so that the longer the object distance the nearer the set point of such timing to the time upon the full open state of the shutter, and, in some cases, such timing is set to the time just when the opening movement of the shutter has completed (full open timing), or the time when the closing movement of the shutter is just started (full open timing). Accordingly, in this case, "during the opening (or closing) movement of the shutter" is to be considered to include "full open state of the shutter".

In the control system mentioned above, the mode signal output circuit 23 constitutes mode signal output means, whereas the calculating control circuit 19 constitutes flash start signal output means.

Next, an operation of the camera according to this embodiment will be explained.

Figure 2:
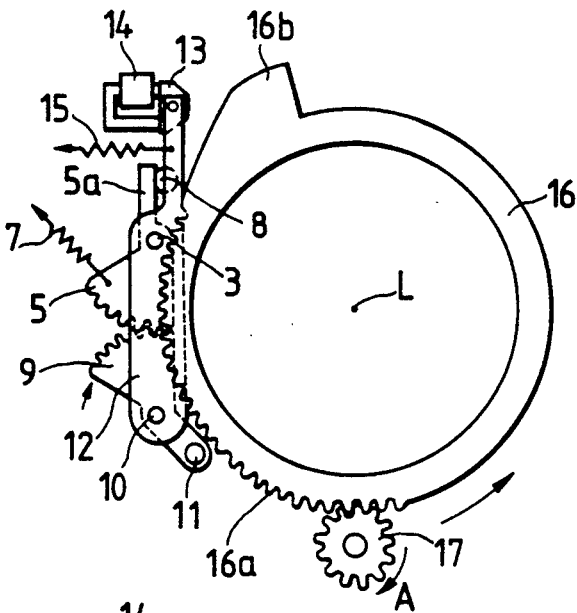
FIG. 2 is an elevational view of a shutter opening and closing mechanism of the apparatus of FIG. 1, in an inoperative condition.

FIG. 2 shows the first and second gear members 5, 9 and the armature lever 12 when the shutter blades 1, 2 are completely closed (reset condition). In this condition, when the mode signal output circuit 23 is set to the normal flash mode and the release button is manipulated, the photometric circuit 21 is enabled to measure the luminance of the object, and at the same time, the distance measuring circuit 22 is also enabled to measure a distance from the camera body to the object. The calculating control circuit 19 receives such luminance information and distance information from the circuits 21, 22 and calculates and processes such information, and thereafter, outputs the command for attraction of the electromagnet device 14 and the command for release of attraction (shutter closing) of the electromagnet device to the electromagnet drive circuit 24, outputs the command for shutter opening through the positive rotation of the motor 18 to the motor drive circuit 25, and further outputs the command for flash start to the light emitting control circuit 20a of the electronic flash device 20.

When the electromagnet device 14 is excited by the attraction command to the electromagnet drive circuit 24, the armature 13 is attracted to the electromagnet. And, when the motor 18 is rotated in the positive direction by the positive rotation command from the calculating control circuit 19 to the motor drive circuit 25, the gear 17 is rotated in a direction shown by an arrow A in FIG. 2, thus rotating the drive ring 16 in an anti-clockwise direction. Consequently, as the drive ring 16 is rotated, the cam 16b begins to engage with the operation pin 19 of the second gear member 9, thereby pushing the operation pin 19 along an inclined surface 16b$_1$ of the cam 16b away from the optical axis L. In this case, since the armature 13 is attracted to the electromagnet device 14, the armature lever 12 does not move, and thus, the second gear member 9 is rotated around the shaft 10 in a clockwise direction. Consequently, the first gear member 5 meshed with the second gear member 9 is rotated around the shaft 3 in an anti-clockwise direction against the bias force of the spring 7. In this case, since the pin 6 fixed to the first gear member 5 is also turned in an anti-clockwise direction, the shutter blades 1 and 2 are rotated around the shafts 3 and 4 in directions shown by arrows B and C in FIG. 1, respectively, with the result that the shutter blades 1 and 2 are shifted slowly toward the open position. When a flat surface 16b$_2$ (FIG. 3) contiguous to the inclined surface 16b$_1$ of the cam 16b is engaged by the operation pin 11, the shutter blades 1, 2 reach the full open positon.

Figure 5A:
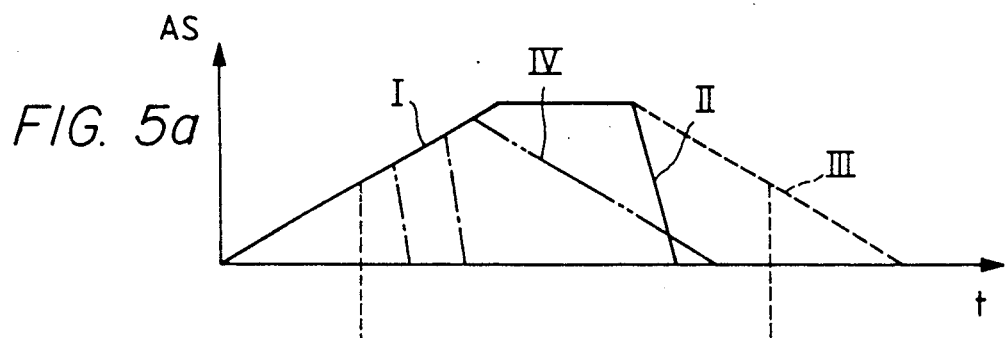
FIGS. 5(a) and 5(b) are graphs showing a shutter opening feature and a timing of a flash start signal of the apparatus of FIG. 1, respectively.

The speed of the opening movement of the shutter blades 1, 2 in this case is determined by an inclination angle of the inclined surface 16b$_1$ of the cam 16b and a rotational speed of the drive ring 16, and the opening movement of the shutter is as shown in the opening feature I illustrated in FIG. 5(a).

While the first gear member 5 is rotated in an anti-clockwise direction, since the bias spring 7 urges the operation pin 11 against the inclined surface 16b$_1$ or flat surface 16b$_2$ of the cam 16b, the armature lever 12 is subject to a reaction force tending to rotate the lever in a clockwise direction. However, because the armature 13 of the armature lever is attracted to the electromagnet device 14, such rotation of the lever due to the reaction force is prevented.

Figure 3:
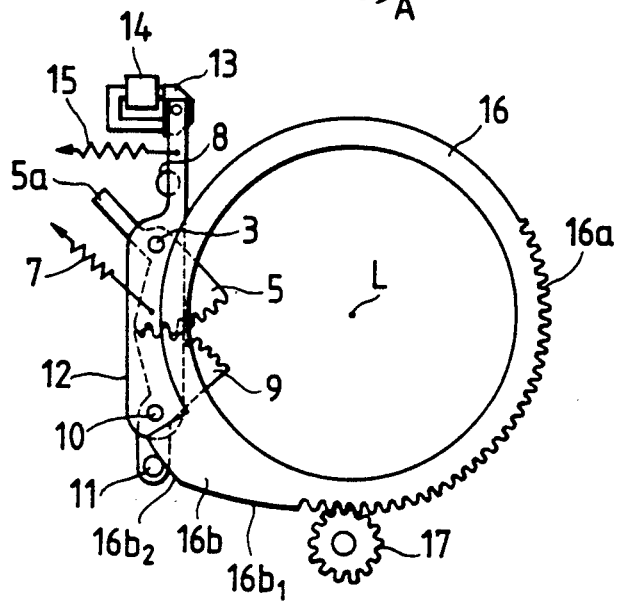
FIG. 3 is an elevational view of a shutter opening and closing mechanism of the apparatus of FIG. 1, in a condition in which shutter blades are opened.

FIG. 3 shows a full open condition of the shutter blades 1, 2 where the flat surface 16b$_2$ of the cam 16b is engaged by the operation pin 11 when the anti-clockwise rotation of the drive ring 16 is completed.

Figure 4:
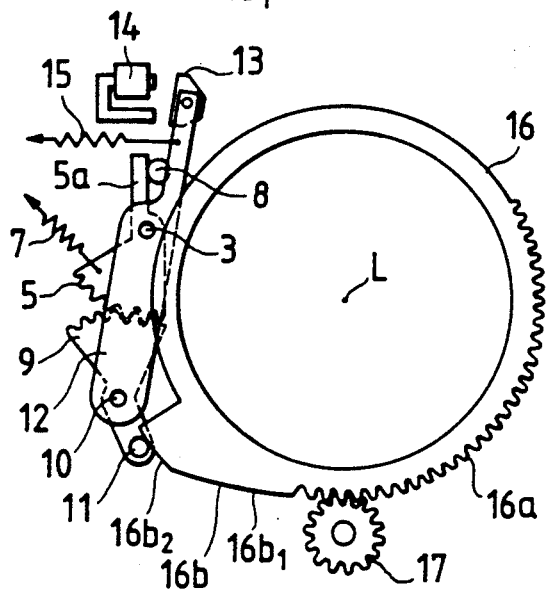
FIG. 4 is an elevational view of a shutter opening and closing mechanism of the apparatus of FIG. 1, in a condition immediately after shutter blades are closed (before reset)

In this condition, when the electromagnet device 14 is deenergized by the shutter closing command to the electromagnet drive circuit 24, since the attraction force of the electromagnet device 14 disappears, as shown in FIG. 4, the armature lever 12 is rotated around the shaft 3 in a clockwise direction by a pulling force of the bias spring 7, and, at the same time, the first gear 5 is also rotated around the shaft 3 in a clockwise direction until the projection lug 5a of the first gear member is abutted against the fixed stop 8. When the projection lug 5a is abutted against the fixed stop 8, the first gear member 5 is stopped, and, in this position, the shutter blades 1, 2 are completely closed. The closing movement of the shutter in this case is effect quickly, as shown in the opening feature II illustrated in FIG. 5(a).

Incidentally, while the reset spring 15 is connected to the armature lever 12, since an anti-clockwise moment acting on the armature lever 12 due to the reset spring 15 is selected to be relatively smaller than a clockwise moment acting on the armature lever 12 due to the bias spring 7, the reset spring does not adversely affect the closing movement of the shutter.

In the above explanation, while an example in which the closing movement of the shutter is started after the opening movement is completed (i.e., the shutter blades reach the full open position) was described, when the electromagnet device 14 is deenergized during the opening movement of the shutter (i.e., while the inclined surface 16b$_1$ of the cam 16b is engaged by the operation pin 11), the shutter blades 1, 2 begin to start the closing movement from that position, as shown by a dot and chain line in FIG. 5(a), thus permitting programmable adjustment of the exposure amount.

Further, from the condition shown in FIG. 4, when the motor 18 is reversely rotated by the reverse rotation command to the motor drive circuit 25 to rotate the drive ring 16 in a clockwise direction, the armature lever 12 is returned (reset) to the inoperative position shown in FIG. 2 only by the reset spring 15, thus pressing the armature 13 against the electromagnet device 14. Accordingly, it is possible to start the above-mentioned operation or movement after the electromagnet device 14 is energized to attract the armature 13 at a predetermined timing in the taking sequence. Incidentally, when the closing movement of the shutter blades 1, 2 is started before the full open state of the shutter, the inoperative condition shown in FIG. 2 is restored by rotating the drive ring 16 in a clockwise direction.

The operation mentioned above is the shutter movement in the normal taking case, and the opening movement of the shutter and the closing movement of the shutter are as shown by the opening feature I and II illustrated in FIG. 5(a).

Figure 5B:
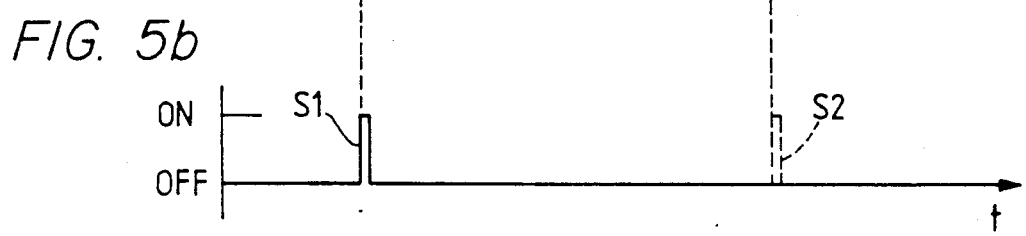
Figure 6A:
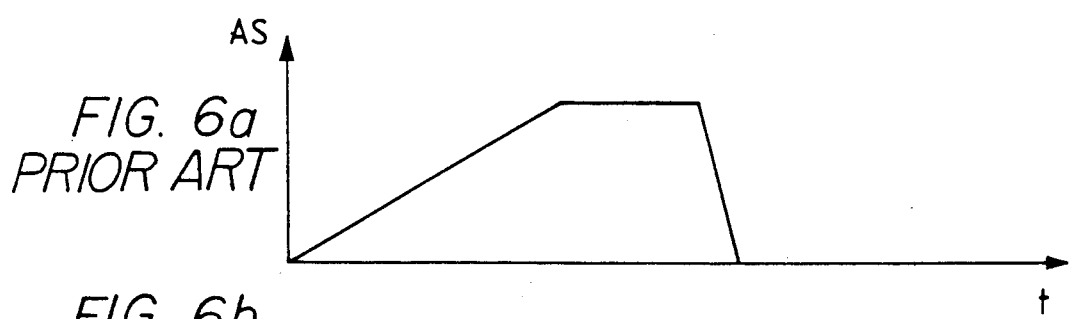
FIGS. 6(a) and 6(b) are graphs showing a shutter opening feature and a timing of a flash start signal of conventional apparatus, respectively.
Figure 6B:
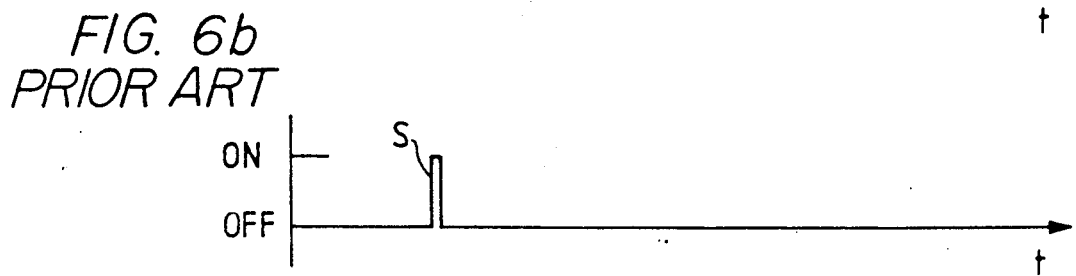

Now, when it is assumed that the luminance of the object is below a predetermined value while the above-mentioned normal flash mode signal is being outputted, the flash start command signal S1 (see FIG. 5(b)) is outputted from the calculating control circuit 19 during the opening movement of the shutter, whereby the light emitting control circuit 20a is operated by this signal to light the flash lamp 20b. The timing of such output is, as mentioned above, so that the longer the object distance, the nearer the signal outputting time to the time when the shutter is full opened.

Next, an example in which the camera is operated in the slow synchronizing mode will be explained.

When the slow synchronizing mode is selected by the flash mode selection switch 30, the mode signal output circuit 23 outputs the slow synchronizing mode signal to the calculating control circuit 19. As a result, the motor drive circuit 25 is set to the slow synchronizing mode. In this condition, when the release button is manipulated, as in the above-mentioned case, the photometric circuit 21 and the distance measuring circuit 22 are enabled, whereby the luminance information and distance information are sent to the calculating control circuit 19. At the same time, as in the case of the above-mentioned normal flash taking operation, the shutter blades 1 and 2 are opened slowly according to the opening feature I shown in FIG. 5(a) to reach the full open position. Then, when a predetermined shutter time has elapsed, on the basis of the motor reverse rotation command from the calculating control circuit 19, the motor drive circuit 25 causes the motor 18 to rotate reversely substantially the same as in the case of the opening movement of the shutter. In this case, the electromagnet device 14 is maintained energized. When the motor 18 is reversely rotated, the drive ring 16 is rotated in a clockwise direction. Here, since the electromagnet device 14 is being energized to attract the armature 13 thereto, the shutter blades 1, 2 fully opened by the cam 16b are closed slowly synchronously with the rotational speed of the drive ring 16, as shown by a broken line III in FIG. 5(a), by returning the operation pin 11 along the inclined surface $16b_1$ of the cam 16b toward the optical axis by the action of the bias spring 7. If the luminance of the object is below a predetermined value, when the time calculated on the basis of the distance information is reached, the calculating control circuit 19 outputs the flash start signal S2 to the light emitting control circuit 20a at the timing shown in FIG. 5(b), thus lighting the flash lamp 20b to illuminate the object.

In this way, the flash emission timing in the light emitting control circuit 20a in the slow synchronizing mode exists on the way of (i.e., during) the closing movement of the shutter, and, therefore, since the exposure time after the flash emission is relatively short, even when the object which is a moving luminous source is taken, in the obtained picture, the light trace of the luminous source does not exist ahead of the body of the luminous source, but rather exists rearwardly of the body of the luminous source. Thus, it is possible to obtain a natural picture even in the case above.

Further, when the clockwise rotation of the drive ring 16 comes to the end, the reverse rotation of the motor 18 is stopped and the electromagnet device 14 is turned OFF, thus returning the lens shutter to the reset condition shown in FIG. 2.

Incidentally, in the illustrated embodiment, while as example in which the closing movement of the shutter in the slow synchronizing mode is effected at the same speed (gradient) as that in the opening movement thereof as shown in the broken line III in FIG. 5(a) was explained, the closing movement may be effected at a different speed (gradient) from that in the opening movement. Further, in the illustrated embodiment, while a so-called slow synchronizing mode for generating the flash synchronously with a relatively later time was explained, it is not necessary to synchronize the flash emission with later time. The flash emission may be effected in the closing movement of the shutter started by rotating the motor 18 reversely at any time during the opening movement of the shutter, as shown by a two-dot and chain line IV in FIG. 5(a). In the present invention, the conception of the second blind synchronism in the single lens reflex camera can be adapted to the lens shutter, and thus, the length of the shutter time is no problem as long as the flash emission is effected during the closing movement of the shutter.

Further, while the timing of the flash emission was determined according to the object distance, the flash emission may be effected at a given timing. Furthermore, while the presence of the flash emission was judged in the camera side, the command for the flash taking may be sent to the camera side at the operator's need. In addition, the present invention can be applied to a lens shutter camera having a dismountable electronic flash device. Lastly, the attraction system of the electromagnet device 14 regarding the armature lever 12 is not limited to the illustrated embodiment.

We claim:

1. A camera having a lens shutter and flash means for emitting flash toward an object, comprising:
   a) signal output means for selectively outputting a first mode signal and a second mode signal;
   b) drive means having first and second modes for effecting opening and closing movement of said lens shutter, said drive means selecting said first mode in response to said first mode signal and selecting said second mode in response to said second mode signal, said drive means effecting the opening movement of said lens shutter at a first opening speed and the closing movement of said lens shutter at first closing speed faster than said first opening speed in said first mode, and effecting the opening movement of said lens shutter at a second opening speed substantially equal to said first opening speed and the closing movement of said lens shutter at a second closing speed slower than said first closing speed in said second mode; and
   c) control means for controlling the timing of flash emission from said flash means, said control means effecting the flash emission of said flash means during the opening movement of said lens shutter in said first mode, and effecting the flash emission of said flash means during the closing movement of said lens shutter in said second mode.

2. A camera according to claim 1, wherein said drive means include an electromagnet and a motor, and the opening movements of said lens shutter at said first and second opening speeds and the closing movement of said lens shutter at said second closing speed are performed by said motor, and the closing movement of said lens shutter at said first closing speed is preformed by said electromagnet.

3. A camera having a lens shutter and flash means for emitting flash toward an object, comprising:
   a) signal output means for selectively outputting a first mode signal and a second mode signal;
   b) drive means including a motor and an electromagnet, said drive means selecting a first mode in response to said first mode signal and selecting a second mode in response to said second mode signal, said drive means causing said motor to effect opening movement of said lens shutter and causing said electromagnet to effect closing movement of said lens shutter in said first mode, and causing said motor to effect the opening and closing movements of said lens shutter in said second mode, and the closing movement of said lens shutter by means of said motor being slower than the closing movement of said lens shutter by means of said electromagnet; and
   c) control means for controlling the timing of flash emission from said flash means, said control means effecting the flash emission of said flash means during the opening movement of said lens shutter in said first mode, and effecting the flash emission of said flash means during the closing movement of said lens shutter in said second mode.

4. A camera having a lens shutter and flash means for emitting flash toward an object, comprising:
 a) signal output means for selectively outputting a first mode signal and a second mode signal;
 b) drive means having first and second modes for effecting opening and closing movements of said lens shutter, said drive means selecting said first mode in response to said first mode signal and selecting said second mode in response to said second mode signal, said drive means effecting the closing movement of said lens shutter at a first closing speed in said first mode, and effecting the closing movement of said lens shutter at a second closing speed slower than said first closing speed in said second mode; and
 c) control means for controlling the timing of flash emission from said flash means, said control means effecting the flash emission of said flash means during the opening movement of said lens shutter in said first mode, and effecting the flash emission of said flash means during the closing movement of said lens shutter in said second mode.

* * * * *